(12) United States Patent
Sanger

(10) Patent No.: US 7,050,200 B2
(45) Date of Patent: May 23, 2006

(54) LOOKUP TABLE FOR ADJUSTING DOT-GAIN ON BITMAP FILES BASED ON AVERAGE NUMBER OF DOTS

(75) Inventor: Kurt M. Sanger, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/645,273

(22) Filed: Aug. 21, 2003

(65) Prior Publication Data

US 2005/0041038 A1    Feb. 24, 2005

(51) Int. Cl.
*H04N 1/405* (2006.01)
(52) U.S. Cl. .................................... 358/3.09
(58) Field of Classification Search .............. 345/596; 358/3.08, 3.07, 1.9; 382/299, 252; 350/3.06, 350/3.09
See application file for complete search history.

(56) References Cited

U.S. PATENT DOCUMENTS

| | | | |
|---|---|---|---|
| 4,630,125 A | 12/1986 | Roetling | |
| 5,164,742 A | 11/1992 | Baek et al. | |
| 5,208,871 A * | 5/1993 | Eschbach | ................... 382/252 |
| 5,250,934 A | 10/1993 | Denber et al. | |
| 5,255,085 A | 10/1993 | Spence | |
| 5,258,854 A | 11/1993 | Eschbach | |
| 5,293,539 A | 3/1994 | Spence | |
| 5,339,170 A * | 8/1994 | Fan | ........................... 358/3.08 |
| 5,483,351 A | 1/1996 | Mailloux et al. | |
| 5,553,171 A * | 9/1996 | Lin et al. | .................... 382/299 |
| 5,680,485 A | 10/1997 | Loce et al. | |
| 5,721,625 A | 2/1998 | Furusawa et al. | |
| 5,767,887 A | 6/1998 | Warner et al. | |
| 6,072,588 A * | 6/2000 | Dohnomae | .................. 358/1.9 |
| 6,115,140 A * | 9/2000 | Bresler et al. | ............... 358/1.9 |
| 6,204,874 B1 | 3/2001 | Michalson | |

OTHER PUBLICATIONS

Graphic technology—Graphic arts reflection densitometry measurements—Terminology, equations, image elements and procedures; ANSI/CGATS 1993, p. 7.

* cited by examiner

*Primary Examiner*—Matthew C. Bella
*Assistant Examiner*—Aaron M. Richer
(74) *Attorney, Agent, or Firm*—Buskop Law Group, P.C.

(57) ABSTRACT

A method for adjusting dot-gain for a halftone binary bitmap file by inputting a halftone binary bitmap file comprising binary pixels to a digital filter, filtering the binary pixels with the digital filter generating a weighted sum of the binary pixels producing a first set of multilevel pixels, filtering the binary pixels with a second digital filter producing a second set of multilevel pixels, sampling the second set of multilevel pixels at a preset sample rate identifying a set of sampled multilevel pixels, inputting the set of sampled multilevel pixels to a lookup table to create an output that is a threshold level for the set of sampled multilevel pixels, using the first multilevel pixels and comparing to the threshold level for the set of sampled multilevel pixels and generating a binary pixel output, and collecting the binary output and forming an adjusted halftone binary bitmap.

54 Claims, 12 Drawing Sheets

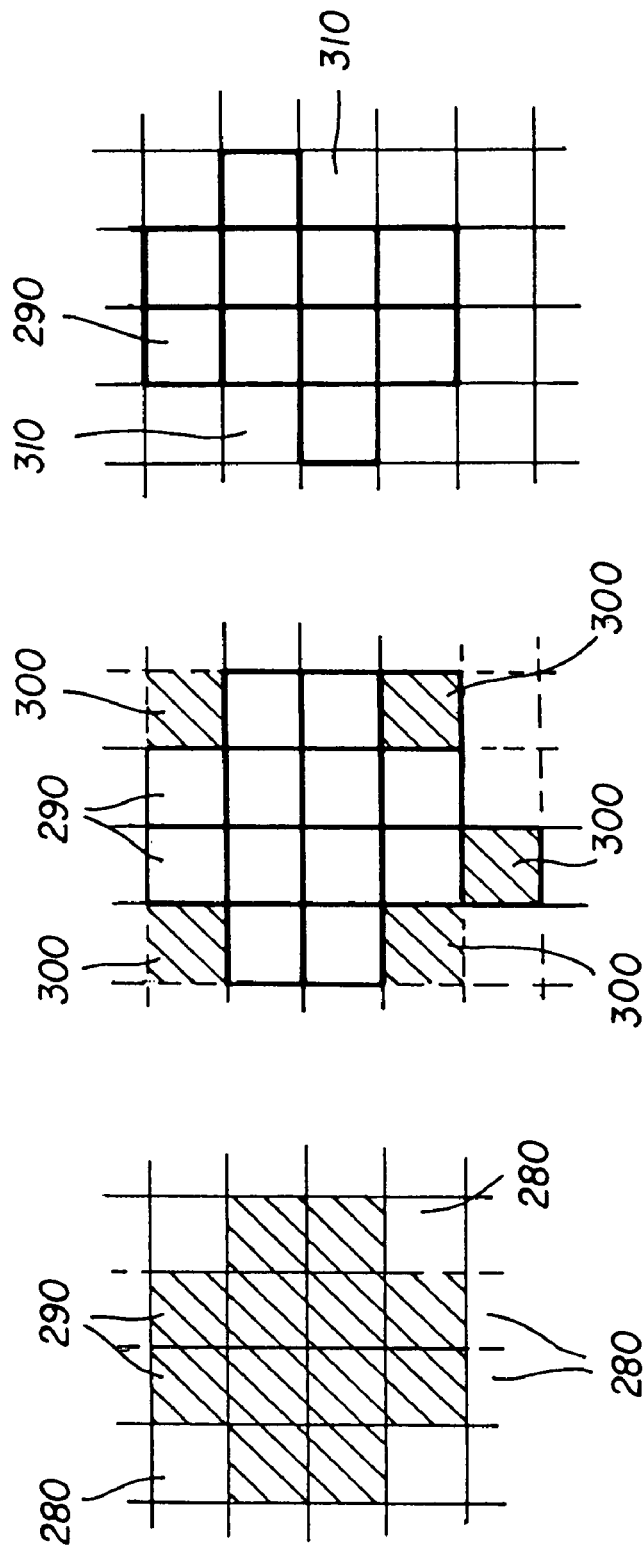

LOOKUP TABLE FOR ADJUSTING DOT-GAIN ON BITMAP FILES BASED ON AVERAGE NUMBER OF DOTS

FIELD OF THE INVENTION

This invention relate in general to lookup tables for adjusting dot-gain on bitmap files.

BACKGROUND OF THE INVENTION

In a digital printing workflow there is a need to be able to proof bitmap files used to make printing plates. Presently, customer artwork consisting of contone images, linework, and text, is first sent to a digital halftone proofer or inkjet printer. The artwork is corrected until the proof is approved for the press. In the case were the artwork is proofed on a digital halftone proofer such as described by Baek et al. in U.S. Pat. No. 5,164,742, the raster image processor (RIP) adjusts the input continuous tone data using a calibration dot-gain curve such that the tone-scale of the proof matches the tone-scale of the press-sheet. After the proof is approved, the job is sent to a second RIP which applies a second dot-gain curve for generating the plate used in the press-run.

The first and second RIPs may be the same but are typically separate and may be located apart from each other. The first and second RIPs are preferably the same type and version such that the halftone dots created and algorithms used by each device are an exact match. Many times the two RIPs are not an exact match, which can create problems. Sometimes incorrect dot-gain correction files are used. Sometimes the artwork is changed between creating the proof and the plates and the press-run no longer matches the approved proof.

Another disadvantage in the current system is that an error in the creation of the bitmaps for printing is not known until the plates are loaded onto the press and the press-run is started. For a press capable of over 1,000 impressions per hour considerable amount of production is lost if the plates are found to be corrupt and need to be remade.

An important aspect in creating a halftone proof is predicting dot-gain or tone-scale. Dot-gain is a known phenomenon attributable to ink spread, ink absorption by the print media, and optical effects between the ink and the paper. The dot-gain varies with the size and shape of the halftone dots, the printing device, the inks, and the paper used, etc. For a digital proof, halftone dots in a color separation are composed of micro-pixels that give the halftone dot its shape and size. Dot-gain for a digital proof corresponds to increasing dot size by adding micro-pixels. Dot-loss for a digital proof corresponds to decreasing dot size by eliminating micro-pixels. Dot-gain correction consists of adding and subtracting gain to match the response at different percent dot inputs.

In the printer described by Baek et al. many steps are required to match the press. First, the exposure for each color plane is adjusted to match the solid area density. Second, the dot-gain for each color plane is adjusted to achieve a dot-gain match at different halftone tint levels. Third, the dot-gain curves and density levels may be fine tuned to achieve either a good neutral match in the three color overprints or a color match for flesh tones. For some work, other memory colors such as green grass or light blue sky may be matched as the critical color. Finally, the dot-gain curves may be further adjusted to deliver better performance in the highlight, or shadow areas. These steps are critical and typically take much iteration between the proof operator and the customer to achieve the look that the customer desires. It is important to be able to adjust the proofer to achieve this look as there are other controls on the press that may be adjusted to affect the dot-gain and tonal control of the press-run. By adjusting the performance of the proofer, the customer is selecting the quality of the proofs that will be used by the pressmen to match.

Once the proofer has been setup to match the press, the customer uses subsequent proofs to setup the press. This is an important point. The proofer setup is used to simulate the press such that the pressman may then use the proofs to setup the press to achieve the customer's intent. Every job going through the proofer will be adjusted with a setup. There may be different setups for each press or press type. There may also be different setups for different customers using the same proofer. Finally there may also be standard setups that are used to simulate jobs across many different presses.

The same job is typically "ripped" again when going to press. This time the RIP is programmed to generate 50% area coverage on plate for the 50% color input. The press is then run to deliver a fixed amount of gain at the 50% input level. Dot-gain is due to the smearing of the ink from the plate to a blanket, the smearing of ink from the blanket to the job paper, and the optical gain of the ink on top of the paper. The control is usually split between the plate making device delivering 50% area coverage for a 50% input, and the press delivering 50% plus its intrinsic dot-gain. Typical dot-gain levels for a Web-fed offset press are 15% to 25% at the 50% input level. Because the dot-gain occurs on the press instead of at the plate writer the bitmaps used to create the plate will not contain enough gain to make the proof. Proofs made from these bitmaps will be washed out and the contrast will be significantly reduced. Colors will also shift, as the gain in each color will be proportional to the dot area coverage.

Other digital halftone printing devices such as that disclosed by Michalson in U.S. Pat. No. 6,204,874 use a binary proofing media that does not allow for adjusting the density level of the solid colorants. A different process is used to adjust these devices for a close press match, including adjusting the tone-scale or dot-gain curve used to make the bitmap file. However, the ideal dot-gain curve on these systems is still different from the dot-gain curves used to make the plates even if the same machine is imaging the plate and the proof as disclosed by Michalson.

Inkjet printing devices are also sometimes used to make a proof. These devices typically image from 300 dpi to 1440 dpi writing resolutions using multiple cyan, magenta, yellow, and sometimes black inks. In addition software such as "Best Screen Proof" available from Best Gmbh, or Black Magic available from Serendipity Software Pty Ltd., may be used to simulate the printing of a halftone screen. This software attempts to measure the halftone screen and adjust the printed output to achieve a close color match to a given target. Resolution of the inkjet devices does not allow for a good match of the halftone dot structure. The color match developed does simulate the tone-scale or dot-gain correction, but only through the driving of the overlapping colors on the proof. The quality of the halftone in the printed proof is significantly compromised. Dots in the highlight and shadow areas are destroyed in trying to match the overall density level in these systems. This is because the inkjet output drops are too large. Therefore one inkjet drop is used to replace many halftone dots in the highlight or bright areas, while one inkjet hole is used to replace many halftone holes in the shadows.

A halftone screen at 150 lines per inch, 6 lines per mm, covers an area of approximately 28,674 $\mu m^2$. An inkjet printer with a 3 pL drop size will produce a dot with a diameter of about 25 µm covering an area of 625 µm². This may vary depending upon the spread into the paper. A single inkjet drop represents a 2.18% change in area within a 150 line screen halftone. To achieve finer resolution the Best Screen Proof, and Black Magic, software use additional inks to image multi-level colorants. Typically a light cyan and light magenta ink are added to the cyan, magenta, yellow, and black primaries to achieve finer control of the tonescale. While this creates a proof with a close visual color match, the structure of the halftone dots within the image is seriously degraded.

The conventional proofing solution is to RIP the file for proofing separate from ripping the file for printing, adding dot-gain to the proofing file as part of the ripping process. U.S. Pat. No. 5,255,085 (Spence) describes a method to adjust the tone reproduction curve of a press or output printer. U.S. Pat. No. 5,255,085 creates a target from the press or desired output proof, benchmarks the characteristics of the proofing device, and discloses a method to generate a lookup table to adjust the dot-gain of the original file to achieve the aim on the proofing device. U.S. Pat. No. 5,293,539 (Spence) adds adaptive process values to interpolate between measured Benchmark and Aim data sets to calibrate the dot-gain tone-scale curve at other screen rulings, screen angles, and dot shapes. Utilizing these techniques to modify the dot-gain curves and hence the tonescale curves of the proofing device increases the chances for error. The input file and its subsequent components must be available for both RIPs. The same versions of each file and components must be specified. The same fonts must be available for both RIPs. The correct dot-gain curve must be specified at both RIPs. The chances for error to occur increase with each ripping operation, especially when the RIPs are located at separate sites.

Ripping the file twice is also time consuming. Each RIP operation must read the input files, decide where each of the components is to be placed in the output print, convert continuous tone images using the correct dot-gain curve into high resolution halftones, render text and linework, and output a high resolution bitmap which represents the composite image. This is repeated for each color in the output print.

Once a commercial halftone proofer implements dot-gain by modifying the code values being printed through a curve prior to converting the code values into the halftone bitmap with the raster image processor. The dot-gain is only applied to the continuous tone image data and not the line work or text. The dot-gain may be adjusted for each of the primary colors cyan, magenta, yellow, and black. A dot-gain curve may also be specified for spot colors orange, green, red, blue, white, and metallic. A dot-gain curve may also be specified for a Equation 1 Murray-Daives Dot Area Calculation $$PercentArea = \frac{10^{-Dtint} - 10^{-Dpaper}}{10^{-Dsolid} - 10^{-Dpaper}}$$

recipe color which is imaged using a single bitmap in combination of two or more standard colors at unique exposure levels. A dot-gain curve may also be specified for each colorant within a recipe color. In this last case more than one bitmap is used, however the halftone dots are at the same screen ruling, screen angle, and phase, such that each halftone dot in each color substantially overlap.

A typical example is a target curve. Such a target might specify that the 50% cyan halftone should print at 67%, the 25% cyan halftone should print at 35%, and the 75% cyan halftone should print at 80%. A benchmark proof is then run and measured. Dot area is calculated based on measured density using the equation defined by Murray-Davies. Equation 1 is the Murray-Davies equation is defined in ANSI/CGATS.4-1993, 1993, p. 7. A dot-gain adjustment curve is then created to add the correct amount to cyan to achieve the target values at the target inputs. For instance in this example we might find that an output value of 35% was achieved at an input level of 30% in the benchmark proof. Therefore 5% dot-gain at the 25% input level is added to achieve the 35% target. At the 50% level we may find we achieved the target level of 67% at an input level of 57% requiring us to add 7% at the 50% input. At the 75% level we may find we achieved the 80% target at the 76% input requiring 1% dot-gain. In actual practice we may measure the dot-gain in 5% or 10% steps with some additional measurements between 0 to 10% and 90 to 100%. A spline curve is usually fit to the resulting dot-gain curve to provide a table in 1% input increments or less. Smoothing is sometimes performed on the input target and benchmark data to further reduce artifacts in the adjustment process.

Perup Oskofot has shown a software program, which operates on high resolution scans from their scanners. The program takes a binary high-resolution scan of a halftone film and de-screens it to a lower resolution continuous tone image. Typically the scan resolution is 2400 dpi. The resulting continuous tone image may be 8 bits per pixel at 300 dpi resolution. A dot-gain curve is then applied to the de-screened image. The adjusted image is then ripped to a bitmap image at 2400 dpi. This software system was disclosed at Drupa 2000, a tradeshow. One problem with this method is that it requires a re-ripping step. To accomplish this requires a RIP. Plus we need to know what the original halftone screen shape, screen ruling, and screen angle were in order to faithfully reproduce it with the re-ripping step. Another problem is that all RIPs are not the same. There are subtle differences between them such as the method that they use to add noise to hide the quantization affects in screening the image. This means that one RIP may not sufficiently reproduce all the screens that the customer might digitize. Another problem with this method is that it is extremely slow. A small 8×10 inch image at 2400 dpi scanned resolution took more than an hour to process a single color plane.

Additionally, some customers have halftone films, which they would like to use in their digital workflow. These customers scan the film at a high resolution, for example 100 pixels/mm, and quantize each pixel to a binary value. Because the dot-gain is built into the film, there is no method other than de-screening the bitmap file, adding dot-gain, and re-ripping the file, to calibrate the output print. If the original film was made using an optical technique then the dot shape, screen ruling, and screen angle may not be an exact match to a digital RIP. De-screening and re-screening the high resolution scan may not faithfully reproduce the original screens.

Denber et. al. disclose a method of shifting and adding a bitmap image with itself to thin the image displayed in U.S. Pat. No. 5,250,934. Denber discloses a method of setting a bit to an intermediate level if it is diagonally between two active bits using shifting, logical and, and a logical or operation.

U.S. Pat. No. 5,483,351 (Mailloux et al.) discloses using a 4×4 input to a lookup table to determine how to operate on the central 2×2 pixels to implement half bit or full bit dilation and erosion in U.S. Pat. No. 5,483,351. U.S. Pat. No. 5,483,351 has the advantage of knowing some of the surrounding pixels in deciding how to dilate or erode the pixels in the center. Eschbach teaches us in U.S. Pat. No. 5,258,854 how to resize bitmap images in small amounts less than one full bit in size.

Loce et al. discloses logically combining two morphological filter pairs and an original image to create an output image in U.S. Pat. No. 5,680,485. The morphological filters described are erosion filters, one of which has less erosion than desired and the other having more erosion than desired. Logically combining combinations of the original image with the two eroded images provides for a method of obtaining an intermediate result.

Eschbach describes a method of resizing an input bitmap in U.S. Pat. No. 5,208,871, which simulates a scan of an output image from an input bitmap such that the scan resolution is different from the input bitmap. Error diffusion is utilized to quantize the output bitmap into the desired output bit resolution. This example uses error diffusion to spread out the error in the quantization of a multilevel pixel into a reduced number of output states.

U.S. Pat. No. 6,115,140 (Bresler et al.) uses a de-screened version of an original image, and dilated and eroded versions of the original image to select a combination of the original, dilated, and eroded images to effect a dot-gain or tone-scale change in an input bitmap image. U.S. Pat. No. 6,115,140, FIG. 5B shows an original halftone image input into block HI along with an eroded version (HE), and two dilated versions (HD1 and HD2). Then a weight based on de-screened versions of the original halftone (CO), the color corrected original (CI), the eroded original (CE), and the two dilated originals (CD1 and CD2) is calculated. The de-screened images are used to select which of the four halftone images, HI, HE, HD1, and HD2, are transferred into H1 and H2. The weighting function is then used to merge bitmap versions of H1 and H2 together into the tone-scaled output bitmap (HO). How to de-screen is not disclosed, nor exactly how to calculate which bit of H1 and H2 is used to drive the output bit HO. The need to use error diffusion to distribute the error in selecting between H1 and H2 is not mentioned.

In U.S. Pat. No. 6,115,140 dilation is described as growing a single pixel completely around the halftone feature. A second dilation grows two pixels completely around the halftone feature. Similarly erosion subtracts a single pixel completely around the halftone feature.

None of the Bresler et al. references teach how to perform de-screening. Roetling performs de-screening by comparing the number of white and dark pixels within a specified area in U.S. Pat. No. 4,630,125. U.S. Pat. No. 4,630,125 also states that "A partial solution known in the art is to spatially filter the halftone image with a low pass filter." U.S. Pat. No. 4,630,125 teaches that the spatial filter method is not exact as it tends to blur the original image.

U.S. Pat. No. 5,767,887 issued to Warner et al. discloses using a Raster Image Processor with two lookup tables for dot-gain. One lookup table is recommended for creating a proof. A second lookup table or dot-gain is recommended for making a plate. The image is processed two times through the raster image processor. Warner disclosed imaging the proof and the plate on the same machine, with the same raster image processor. This is not always possible if the proof and the plate are needed in different locations.

Furusawa et al. in U.S. Pat. No. 5,721,625 discloses using a digital filter to filter an input continuous tone image and use the filtered output to select from multiple dot generators or raster image processors. Furusawa selects a dot created using a traditional amplitude modulated screen for areas of the print that contain low frequency information. Furusawa selects a dot created using frequency modulated screens for areas of the print that contain high frequency information. The frequency content of the image is output from the digital filter.

SUMMARY OF THE INVENTION

A digital file which is a binary bitmap of a halftone screened image is filtered with a blur filter. The blurred image is then converted back into a binary bitmap image using a quantization level. The quantization level determines how much dot-gain or loss is imparted onto the original file. This addition is the use of a lookup table to select the quantization level based on the average number of dots in the local area of the image.

Binary halftone bitmap files which are to be imaged onto a printing plate, may be input to a digital halftone color proofer. However, without adjusting the dot-gain the resultant proof will not be a direct match for the press sheet as the system MTF of the printing system and the proofing system are not the same. By adjusting the dot-gain of the bitmap file the resultant proof will simulate the printing system. Today the bitmap image is created with a specific dot-gain curve based on whether the resulting bitmap is used to make a proof, or used to run on press.

An advantage of the present invention is that any bitmap file which is to be used to go to press may be proofed directly. Today a proof made with a bitmap file that is used to make the plate would be incorrect.

A further advantage of the present invention is that any bitmap file which is to used to proof, may be converted into a bitmap file to go to press.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 6a shows an input bitmap;

FIG. 6b shows an output bitmap with gain;

FIG. 6c shows an output bitmap with dot loss;

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
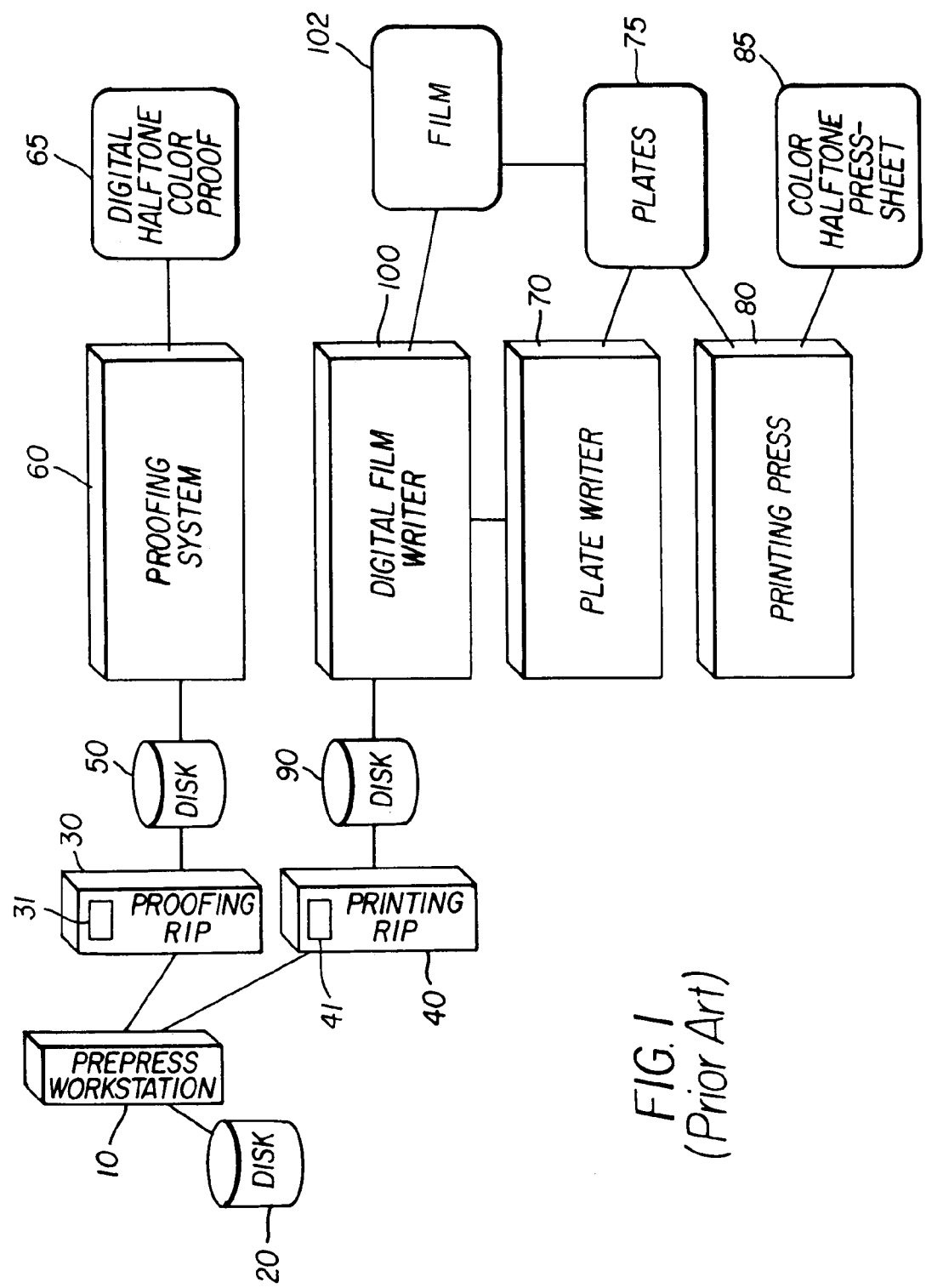
FIG. 1 is a block diagram showing the conventional workflow for digital halftone file processing.

Referring to FIG. 1, there is shown a prepress workstation 10, with customer artwork stored on disk 20. The customer may store images, text and line-work on disk 20. The customer may use a program such as Quark's QuarkXPress to combine the images, text, and line-work into a job consisting of one or more pages. The QuarkXPress Program can run on the prepress workstation 10 and may output the job as a postscript or as a portable document format (PDF), file to either the RIP for proofing 30, or the RIP for printing 40. Each RIP may consist of a software RIP running on a PC such as Harlequin "ScriptWorks" by Global Graphics Software LTD.

RIP 30 has a postscript text file, which specifies the dot-gain adjustment for proofing to be applied to all of the continuous tone images within the customer job. This file contains the input and output percent dot relationships for all the colors in the job. The procedure to create this lookup table is described by Spence as referenced above and implemented in software, such "Dot-gain Manager", which is available in digital halftone proofers.

The RIP will convert cyan, magenta, yellow, and black (CMYK) continuous tone images through the dot-gain lookup table. Then the RIP will convert the continuous tone image into a halftone image at the writing resolution of the proofing system 60. The halftone bitmap images may be sent directly from RIP 30 to proofing system 60 or they may be temporarily stored on disk 50. The proofing system 60 outputs a digital halftone color proof 65. A dot-gain curve 31 on RIP 30 can be used for proofing.

RIP 40 will have a similar postscript text file that specifies the dot-gain adjustment for the printing press 80 to be applied to all of the continuous tone images within the customer job. The dot-gain curve 41 on RIP 40 may be used to linearize the printing plate 75 such that a 50% input creates 50% dot area coverage on the printing plate 75.

The 50% dot area coverage on the printing plate 75 then produces a press sheet 85 on printing press 80 with additional gain, typically a 15–25% increase. The plate writing system 70 may have an intrinsic gain associated with it, which is compensated for in the same dot-gain curve 41 in RIP 40. The plate writing system 70 may be positive or negative writing, such that areas exposed on the plate 75 may accept or reject ink when used on the printing press 80. The positive or negative mode of the plate writing system will typically require negative or positive dot-gain adjustment to create a linear plate or a calibrated plate. Typically the plate writing system has a dot loss or dot-gain of 1% to 3%.

The plate writing system 70 may be co-located in the printing press 80. In this case the printing press contains additional capability of being able to image the printing plates 75 which are already mounted on the printing press.

A digital film writer 100 may precede the plate writing system. 70.

A disk 90 can be in communication with RIP 40. Bitmaps can be stored on the disk 90 and used to make film 102 or the printing plate 75. If a digital film writer 100 is used then at least one film 102 may be used to make the plate by making an optical contact exposure 104. Additional dot-gain or dot loss may occur due to performing the contact exposure and processing of the printing plate may be compensated for in the dot-gain curves.

It is understood that there may also be iterative steps of making film and plates with the end result of a printing plate being mounted in the printing press and used to create a press sheet 85 with the customer artwork. The dot-gain curve 41 used in RIP 40 may contain compensation for all of the steps used to create the printing plate. In addition the dot-gain curve 41 in RIP 40 may also contain dot-gain compensation for a given printing press to achieve a desired target.

The plate writing system 70 outputs a set of printing plates 75 which may be digital and used in the printing press 80 to create color halftone press-sheets 85. It is contemplated that this invention may also be used in a system which use only black and white as the colors, a single color, or multiple colors and the invention is specifically not limited to process color, cyan, magenta, yellow, and black (CMYK) printing systems.

Figure 2:
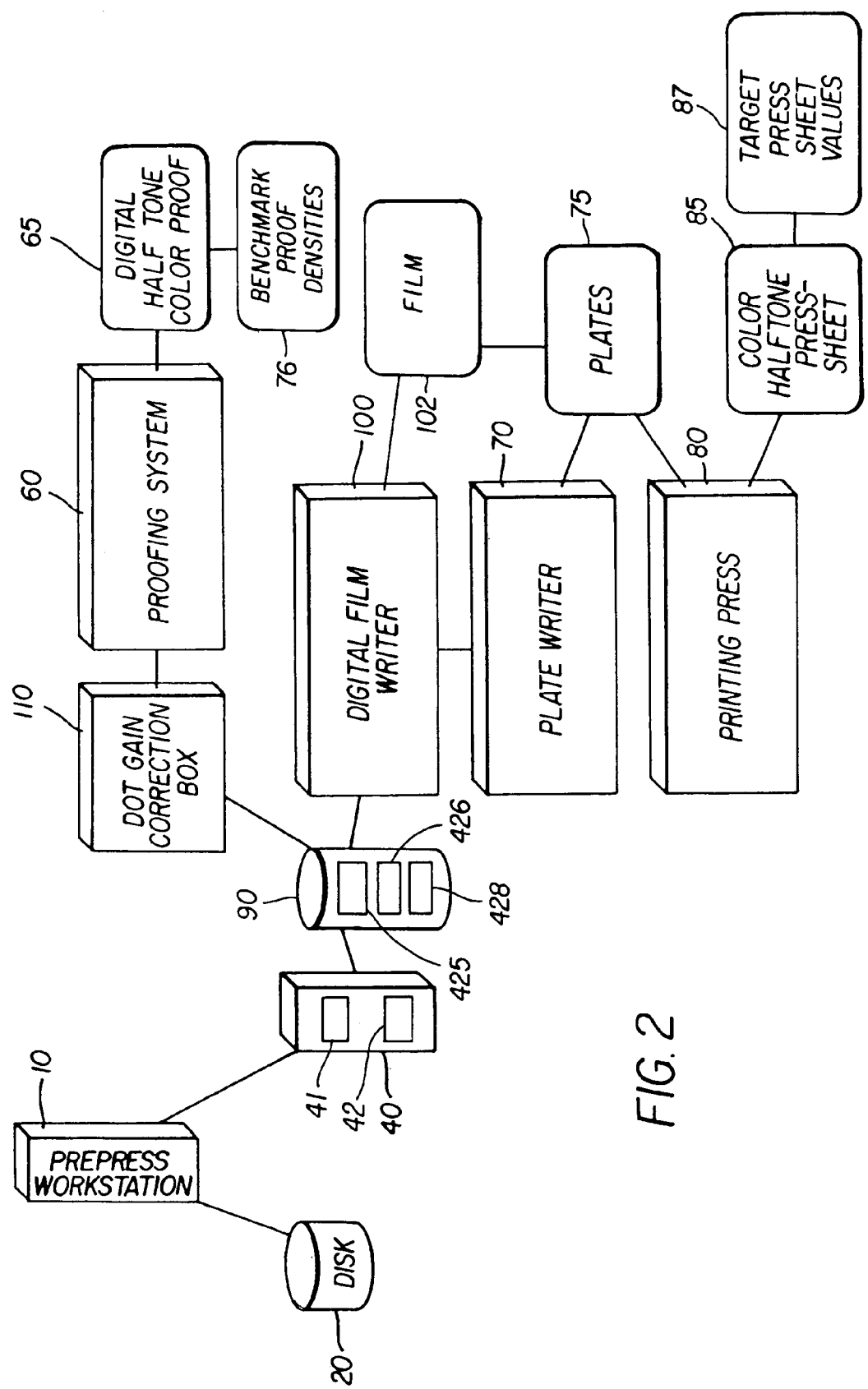
FIG. 2 is a block diagram showing the method of the present invention for adding dot-gain to a digital halftone file.

Referring now to FIG. 2 customer artwork is stored on disk 20. The customer may store images, text and, line-work on disk 20. The customer may use a program such as Quark's QuarkXPress to combine the images, text, and line-work into a job consisting of one or more pages. The QuarkXPress Program running on the prepress workstation 10 may output the job as a postscript or portable document format (PDF), file to the RIP 40 for printing and/or proofing. The RIP 40 may consist of a software RIP running on a PC such as Harlequin "ScriptWorks" by Global Graphics Software LTD.

The RIP 40 will convert the customer artwork into binary halftone files which may be stored on disk 90 on their way to plate writing system 70. The binary data files 425 will be screened at a screen ruling 426 and screen angle 428. This screened information 426, 428 may also be stored on disk 90.

RIP 40 will have a postscript text file which will specify the dot-gain curve 41 for the printing press to apply to all of the continuous tone images within the customer job. The dot-gain curve 41 on RIP 40 may be used to linearize the printing plate such that a 50% input creates 50% dot area coverage on the printing plate.

The 50% dot area coverage on the printing plate 75 then produces a press sheet 85 on the printing press 80 with additional dot-gain. The plate writing system 70 may have an intrinsic dot-gain associated with it, which is compensated for in the dot-gain curve 41 in RIP 40.

The plate writing system 70 may be positive or negative writing, such that areas exposed on the printing plate may accept or reject ink on the printing press. The positive or negative mode of the plate writing system will typically require negative or positive dot-gain adjustment to create a printing plate 75, which in a preferred embodiment is a linear printing plate. Typically plate writing systems have a dot loss or dot-gain of 1% to 3%.

The plate writing system 70 may be co-located in the printing press 80. In this case the printing press contains additional capability of being able to image the printing plates which are already mounted on the printing press.

A digital film writer 100 may optionally, precede the plate writing system. Binary bitmap data files 425 can be used to make the film 102 or the printing plate 75 and may be stored temporarily on disk 90 prior to making the film or plate. If a digital film writer is used then the films may be used to make the printing plate by making an optical contact exposure 104. The additional dot-gain or dot loss due to performing contact exposure and processing of the plate may be compensated for in the dot-gain curves 41 used to make the film 102.

It is understood that there may also be iterative steps of making film and plates with the end result of a plate being mounted in the press used to create a press sheet with the customer artwork. The dot-gain curve 41 used in RIP 40 may contain dot-gain compensation for all of the steps used to create the printing plate. In addition the dot-gain curve 41 in RIP 40 may also contain dot-gain compensation for a given printing press 80 to achieve a desired printed result.

The plate writing system 70 outputs a set of printing plates 75 used in the printing press 80 to create color halftone press-sheets 85.

The bitmap images 425 stored or copied to disk 90 may also be sent using dot-gain correction box 110 to a proofing system 60. In this case the dot-gain correction box 110 can be programmed to cancel all or a portion of the dot-gain curves 41 used to make the printing plates and add the dot-gain correction required to allow the proofing system 60 to match the press sheet 85. A modified dot-gain correction is preferably performed in one step using a single combined dot-gain curve 112.

To obtain the dot-gain curve 112 used in the dot-gain correction box 110, the customer runs a test proof 42 through the RIP 40 to make printing plates 75 and a press sheet 85 on printing press 80.

The press sheet 85 made with the test proof 42 is measured and becomes the target press sheet values 87. Specific binary bitmap data files 425 are made for the test proof and are stored in disk 90. These specific bitmaps are passed directly to the proofing system 60 bypassing the dot-gain correction box 110. The resulting proof is called the benchmark proof 65. The benchmark proof 65 is measured creating benchmark proof densities 76 and compared to target press sheet values 87. The dot-gain adjustment required to add to the percent dot into the dot-gain on bitmaps in the correction box 110 are calculated by finding or calculating the percent dot input value resulting in a percent dot output value on the benchmark proof 65 required to achieve the percent dot output value on the target press sheet 85.

Figure 3:
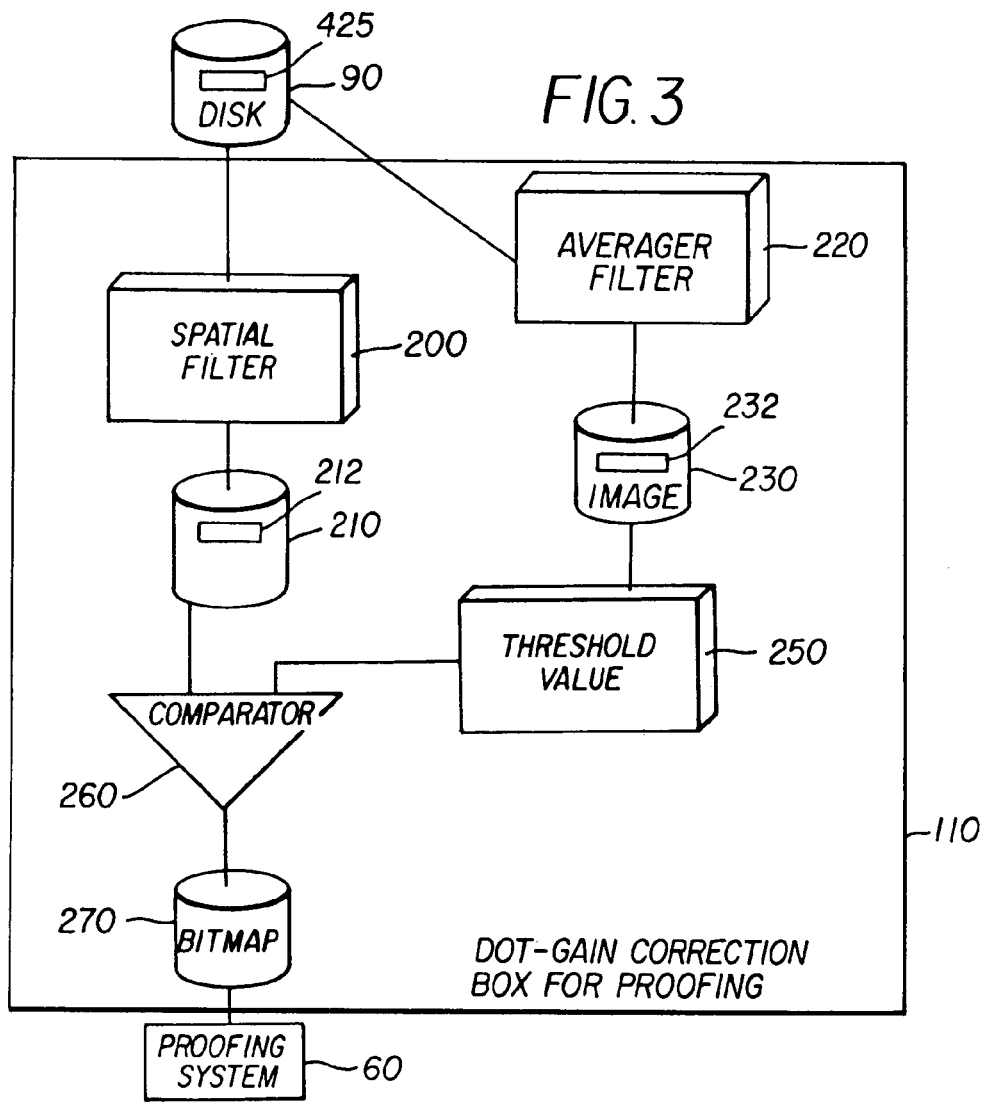
FIG. 3 is a flow diagram showing the processing steps for adding dot-gain compensation to a rasterized halftone digital image file.

FIG. 3 shows the dot-gain correction box 110 in detail. In this Figure, a halftone binary bitmap data file 425 is stored on disk 90 and is convolved through a spatial filter 200 to create a blurred continuous tone image 210. The halftone binary bitmap data file 425 is simultaneously passed through an averager filter 220 to create a local area averaged image 230.

For each pixel 212 in the blurred continuous tone image 210, a corresponding local area average 232 in the averaged image 230 is used to estimate the dot area. The output of the averaged image 230 is and averaged value 232 which is then input to a lookup table 240. The lookup table 240 contains a table of threshold levels enabling a threshold output 250 to be used with the pixels of the blurred continuous tone image 210.

Each pixel 212 of the blurred continuous tone image 210 is compared to the threshold levels 250 using a comparator 260. The output of the comparator 260 is the dot-gain adjusted halftone bitmap 270. This bitmap 270 is then sent to the proofer 60. The averager filter 220 size is preferably 13 pixels by 13 lines.

To create the dot-gain adjusted halftone bitmap 270, the lookup table 240 and the averager 220 are used to change the threshold level 250 based on the local area average 232 to achieve the desired dot-gain curve 112.

Figure 5:
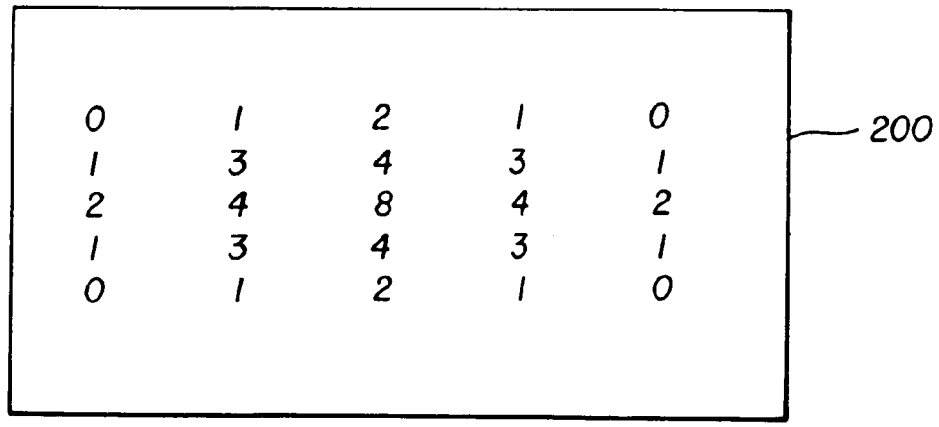
FIG. 5 contains a spatial filter used in one example.
Figure 4:
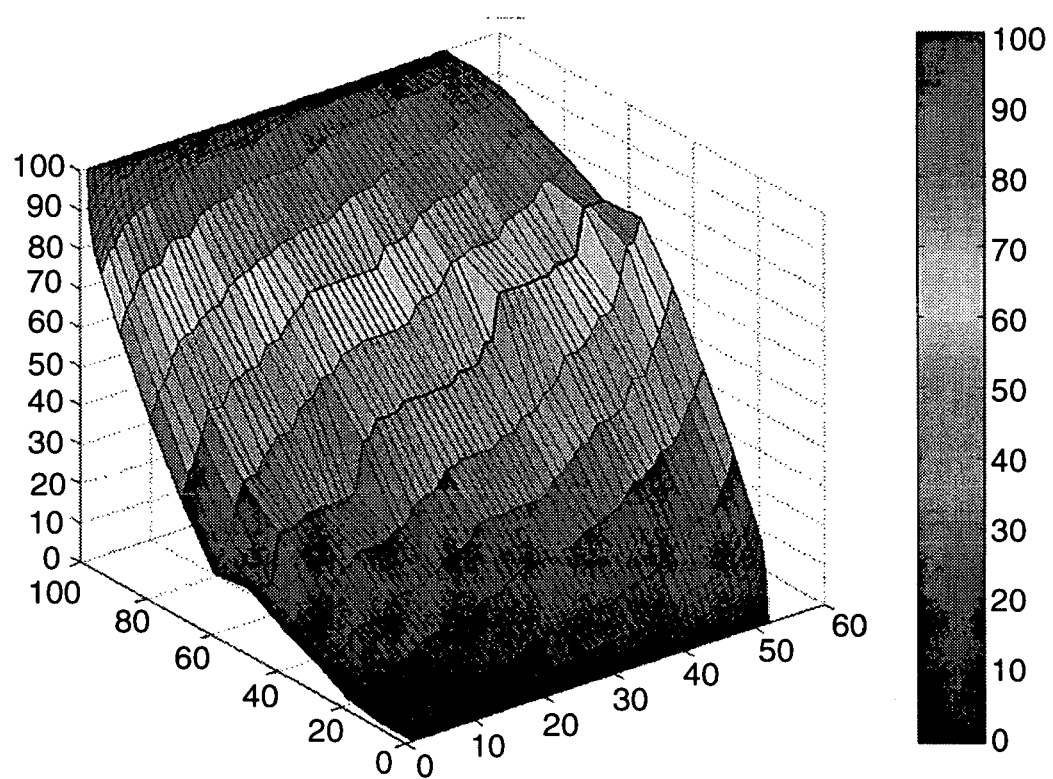
FIG. 4 contains a graph of percent dot out verses percent dot in by threshold value for the dot-gain method described.

FIG. 4 shows the percent dot area output within bitmap 270 as a function of the averaged image 230 using a 13 pixel by 13 line averager 220 and the threshold level 250 when used with the spatial filter 200 shown in FIG. 5. The desired dot-gain curve 112 is used in conjunction with FIG. 4 to load the lookup table 240 with the correct threshold levels 250 for a given local area average 232.

To compute the table of threshold levels 240 required to achieve the desired dot-gain curve 112 for a scanned halftone bitmap input a scanned tint scale can be used instead of the customer artwork.

It should be noted that within the scope of this invention each screen ruling, screen angle, and dot shape will have a different response and must be modeled separately. The described embodiment requires numerous calculation steps prior to performing the dot-gain compensation on the customer's bitmaps; however these steps may be performed ahead of time so that the actual dot-gain correction may be replicated quickly on each incoming bitmap file.

FIGS. 6a, 6b, and 6c, are an example showing how the bitmaps might be modified using this invention.

FIG. 6a shows an input dot comprises 12 on micro-pixels 290 and off micro-pixels 280. For a 13 pixel by 13 linear averager output would be 12 pixels out of 169 pixels for a percent dot input of approximately 7.1%.

FIG. 6b shows how an addition of 5 micro-pixels 300, produce an output halftone dot consisting of a total of 17 micro-pixels out of 169 pixels which is approximately 10.1%.

FIG. 6c shows how a subtraction of 2 micro-pixels 310, for the 13 pixel by 13 line average measures a dot loss of 1.1%.

This invention preserves the halftone dot in the output bitmap while adjusting the apparent tone scale of the proof.

To compensate for different halftone screen rulings and screen angles the size of the averager can be changed. Also, the averager may be larger than one halftone dot area such that the calculated dot percentage may be based on a fractional output of the averager.

Figure 7:
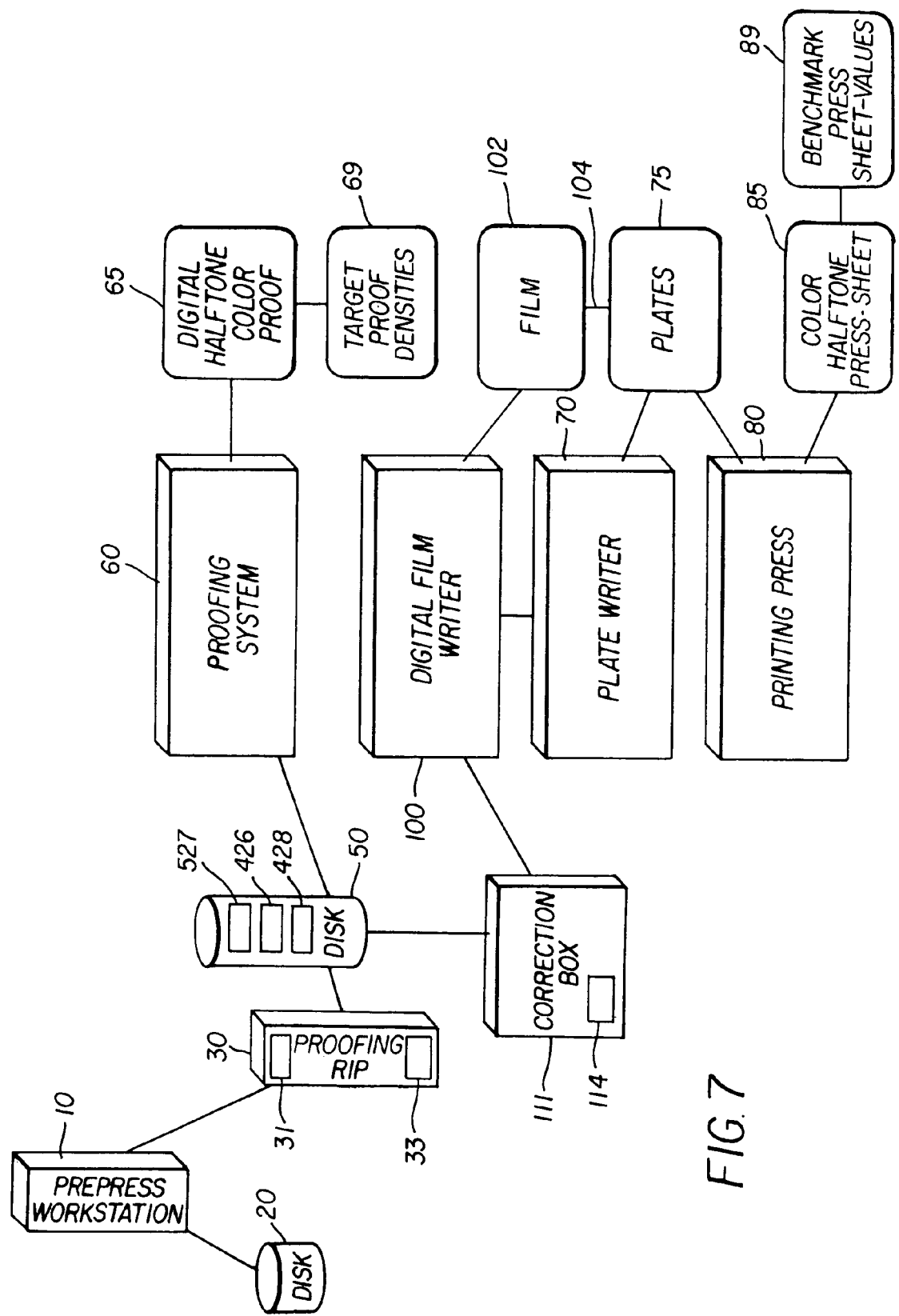
FIG. 7 is a block diagram showing the method of the present invention for adding dot-gain to the digital halftone files used to make the printing plates.

Referring now to FIG. 7, customer artwork is stored on disk 20. The customer may store images, text and, line-work on disk 20. The customer may use a program such as Quark's QuarkXPress to combine the images, text, and line-work into a job consisting of one or more pages. The QuarkXPress Program running on the prepress workstation 10 may output the job as a postscript or portable document format (PDF), file to the RIP 30 for proofing and printing. The RIP 30 may consist of a software RIP running on a PC such as Harlequin "ScriptWorks" by Global Graphics Software LTD. RIP 30 will have a postscript text file which will specify the dot-gain adjustment for proofing to apply to all of the continuous tone images within the customer job. The dot-gain curve 31 on RIP 30 may be used to match a known standard such as the Committee for Graphic Arts Technical Standardization (CGATS) Technical Report 001 (TR0001).

RIP 30 will output, cyan, magenta, yellow, and black (CMYK) binary bitmap files 527 to disk 50 on their way to proofer 60 to create proof 65.

Binary bitmap files for proofing 527 may also be used with the invention to create printing plates 75. A dot-gain correction box 111 for printing will be programmed to unbuild the dot-gain correction for proofing and build in the dot-gain correction required such that the press-sheet 85 matches the proof 65.

The plate writing system 70 may be co-located in the printing press 80. In this case the printing press contains additional capability of being able to image the printing plates which are already mounted on the printing press.

A digital film writer 100 may optimally precede the plate writing system 70. The dot-gain correction box 111 can then be programmed to take into account the additional dot-gain or dot loss required due to usage of the digital film writer, 100 and the contact process 104 of making the printing plates 75.

It is understood that there may also be iterative steps of making film 102 and the printing plates with the end result of a printing plate being mounted in the printing press used to create a press sheet 85 with the customer artwork. The dot-gain curve 114 used in the dot-gain correction box 111 may contain compensation for all of the steps used to create the printing plate. In addition the dot-gain curve 114 may also contain compensation for a specific printing press to achieve a desired press sheet To obtain the dot-gain curve 114 used in the dot-gain correction box 111 calculation, the customer runs a test proof 33 through the RIP 30 to make printing plates 75 and a press sheet 85 on printing press 80. The press sheet 85 made with the test proof 33 and is densities are measured and the measured densities become the benchmark press sheet values 89.

The specific binary bitmap files for proofing 527 are stored in disk 50. These same bitmaps are passed directly to the proofing system 60. The resulting proof is called the target proof 65. The target proof 65 is measured for target proof densities 69. The benchmark proof is measured for benchmark press sheet values 89 and compared to the target proof densities 69.

The dot-gain adjustments required to add or subtract t dot-gain are performed using the dot-gain correction box 111.

Figure 8:
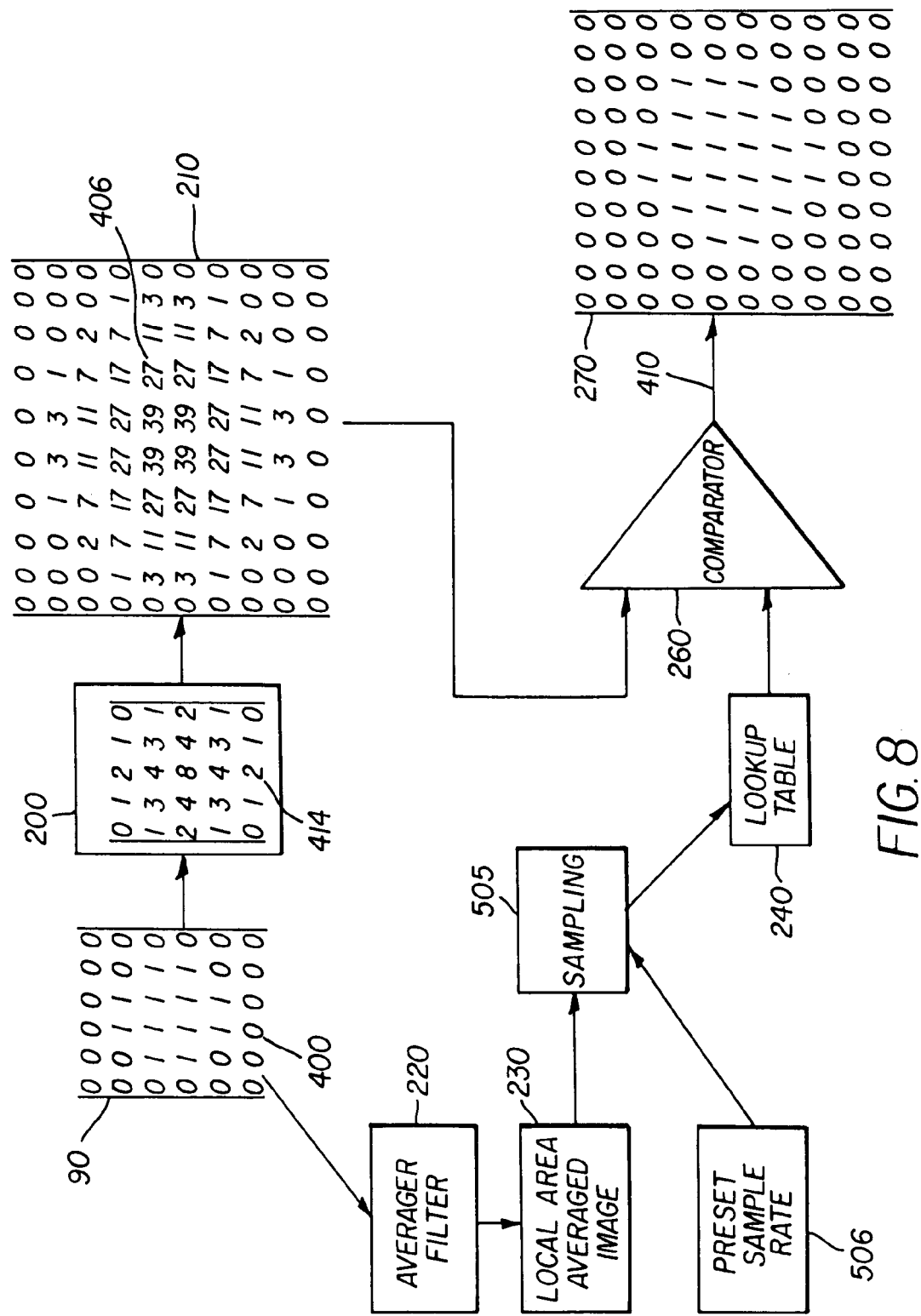
FIG. 8 is a block diagram showing the method of the present invention for adding dot-gain to the digital halftone files for use in making the proof, and adding dot-gain to the same digital halftone files for use in making the plates.
Figure 9:
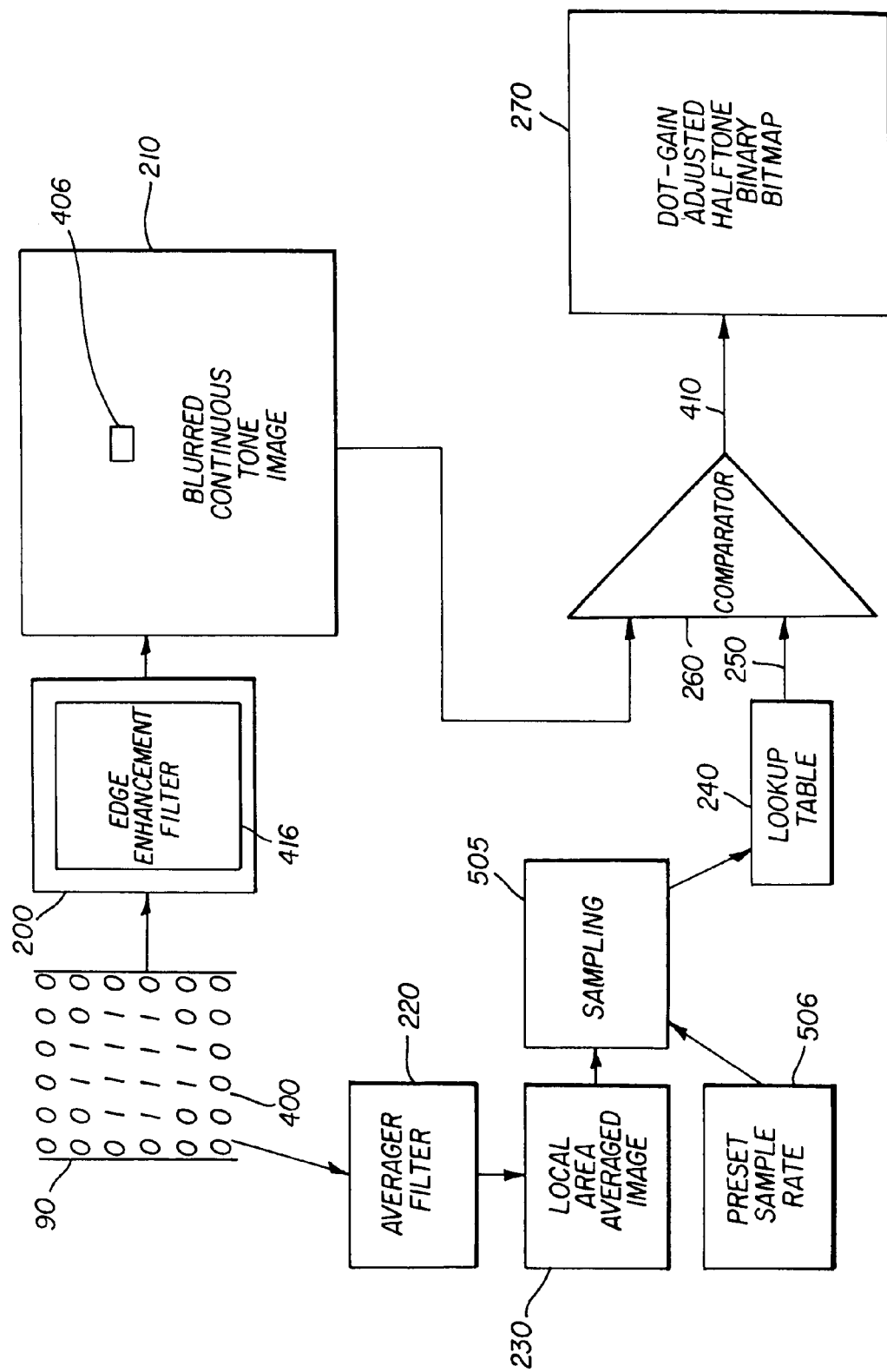
FIG. 9 is a block diagram showing the method of the present invention using an edge enhancement filter.

As shown in FIG. 8, the invention is a method for adjusting dot-gain for a halftone binary bitmap file. The method begins by inputting a halftone binary bitmap file comprising binary pixels 400 to a digital filter 200 and filtering the binary pixels 400 with the digital filter generating a weighted sum 406 of the binary pixels 400 producing a first set of multilevel pixels 210.

Next, the binary pixels 400 are filtered using a second digital filter 220 producing a second set of multilevel pixels 230.

The method continues by sampling 505, the second set of multilevel pixels at a preset sample rate 506. As a set of sampled multilevel pixels are input to a lookup table 240 to create an output 250 that is a threshold level for the set of sampled multilevel pixels.

The method ends by using the first multilevel pixels 210 and comparing the first level to the threshold level 250 using comparator 260, and generating a binary pixel output 410 and collecting the binary pixel output 410 and forming an adjusted halftone binary bitmap 270.

The first digital filter of the above invention can be a blur filter 414, an edge enhancement filter 416, an averager filter 418, a high pass filter 420, a low pass filter 422, or a band pass filter 424.

The blur filter 416 is shown in FIG. 8.

Figure 10:
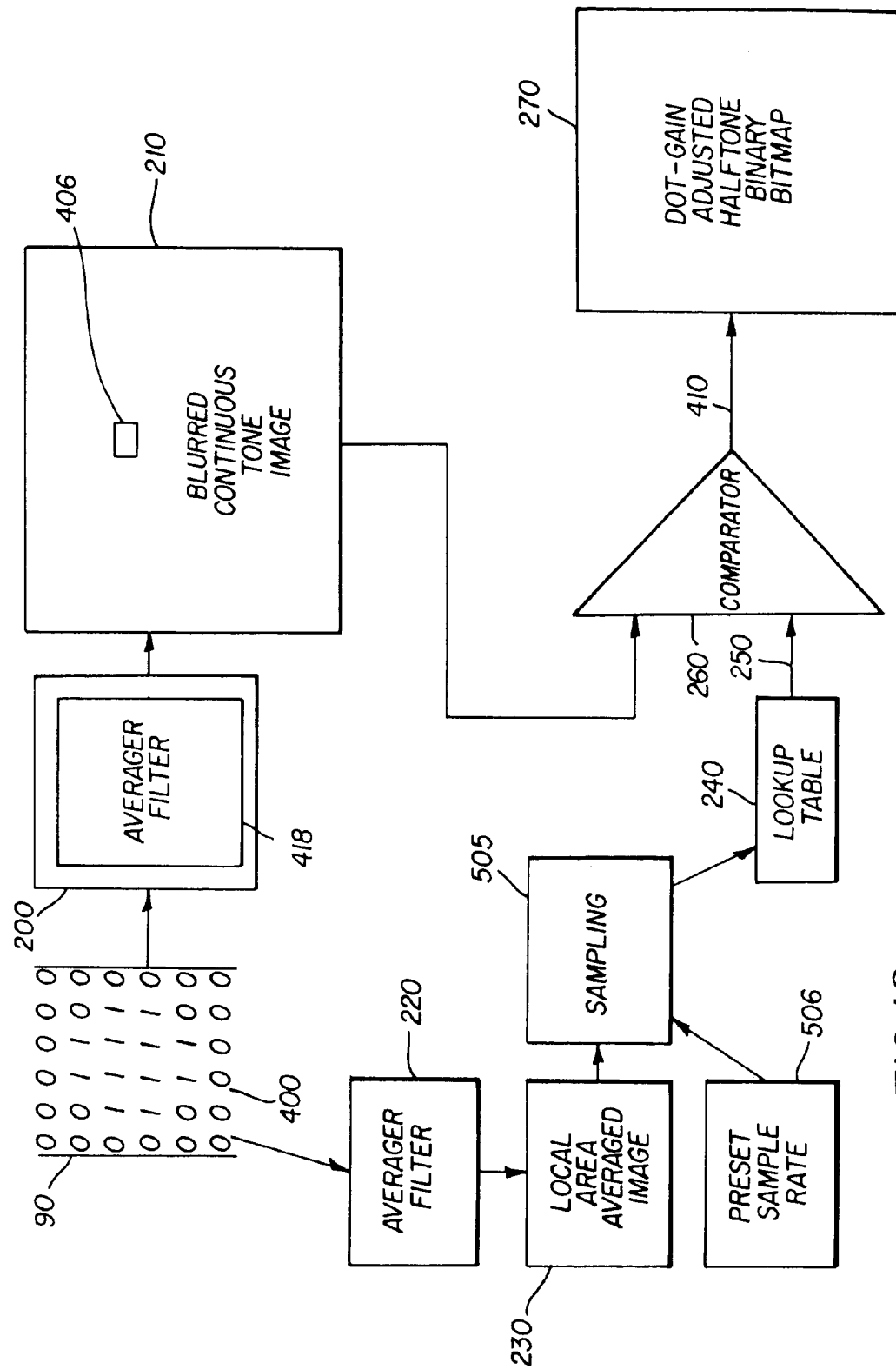
FIG. 10 is a block diagram showing the method of the present invention using an averager filter.

The edge enhancement filter 418 usable in this invention is seen in FIG. 10.

Figure 11:
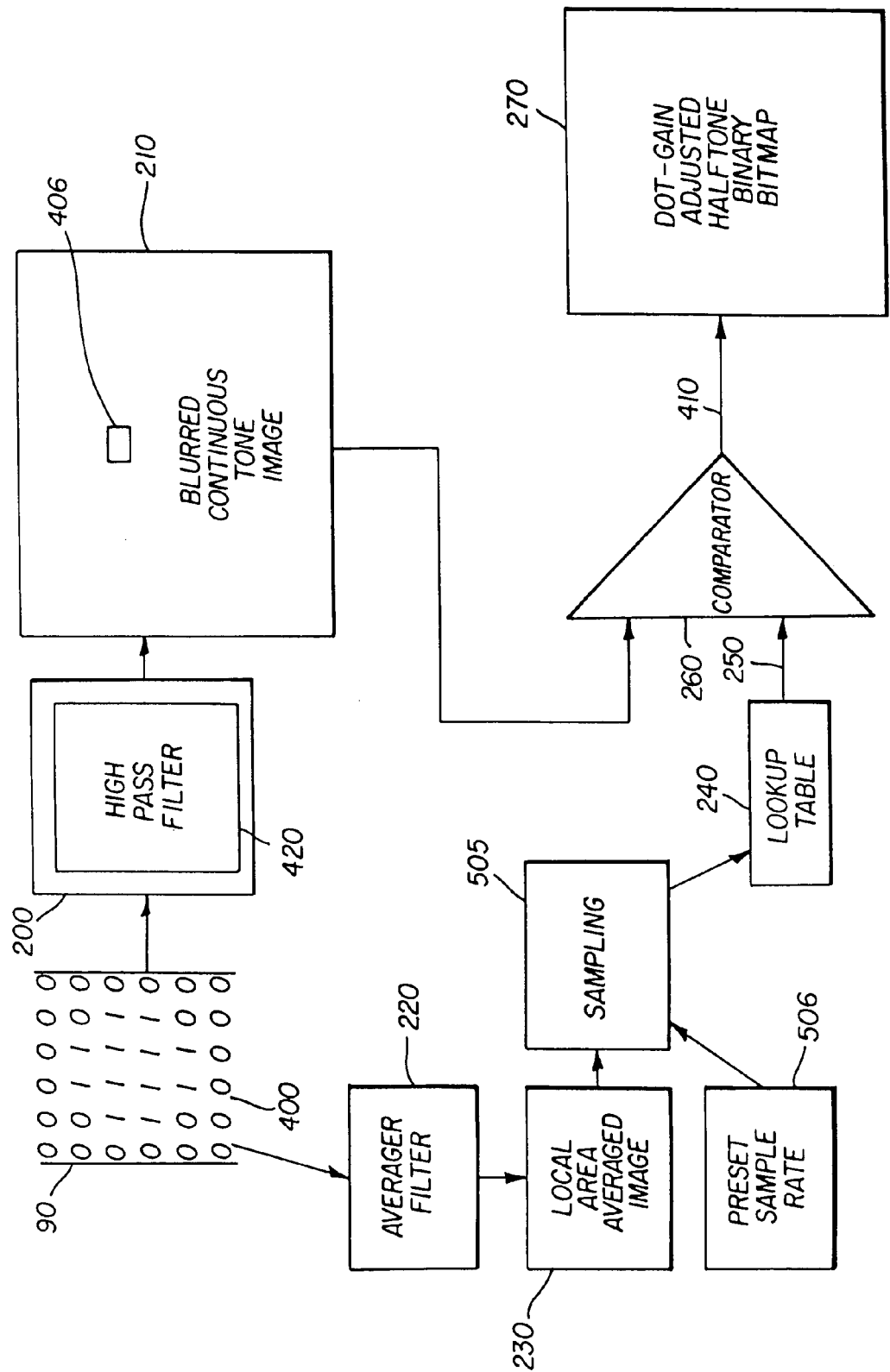
FIG. 11 is a block diagram showing the method of the present invention using a high pass filter.

The average filter 418 usable in this invention is shown in FIG. 11.

Figure 12:
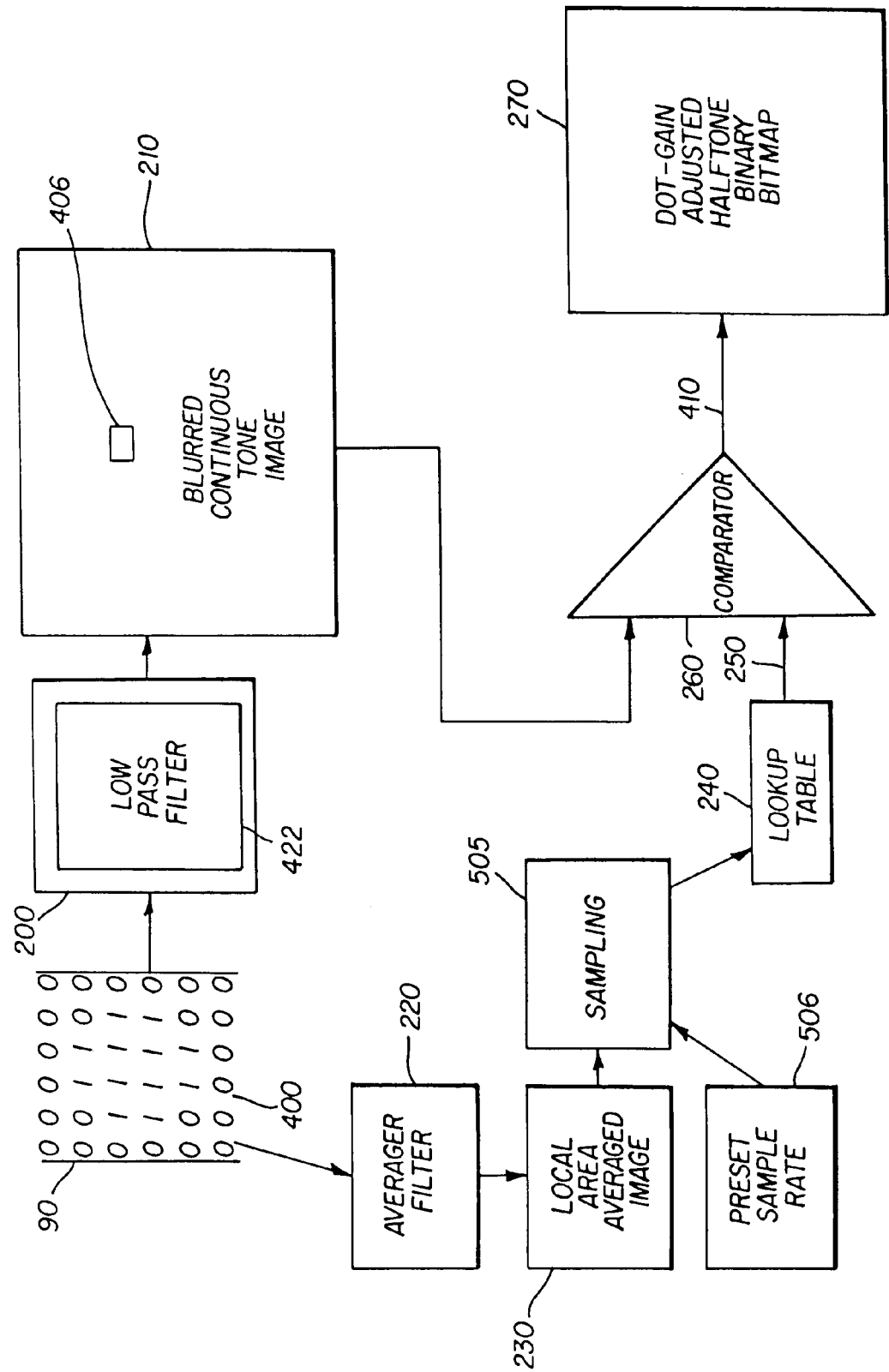
FIG. 12 is a block diagram showing the method of the present invention using a lower pass filter.

FIG. 12 shows the high pass filter 420 as usable in this invention.

FIG. 12 shows the low pass filter 422 as usable in this invention.

Figure 13:
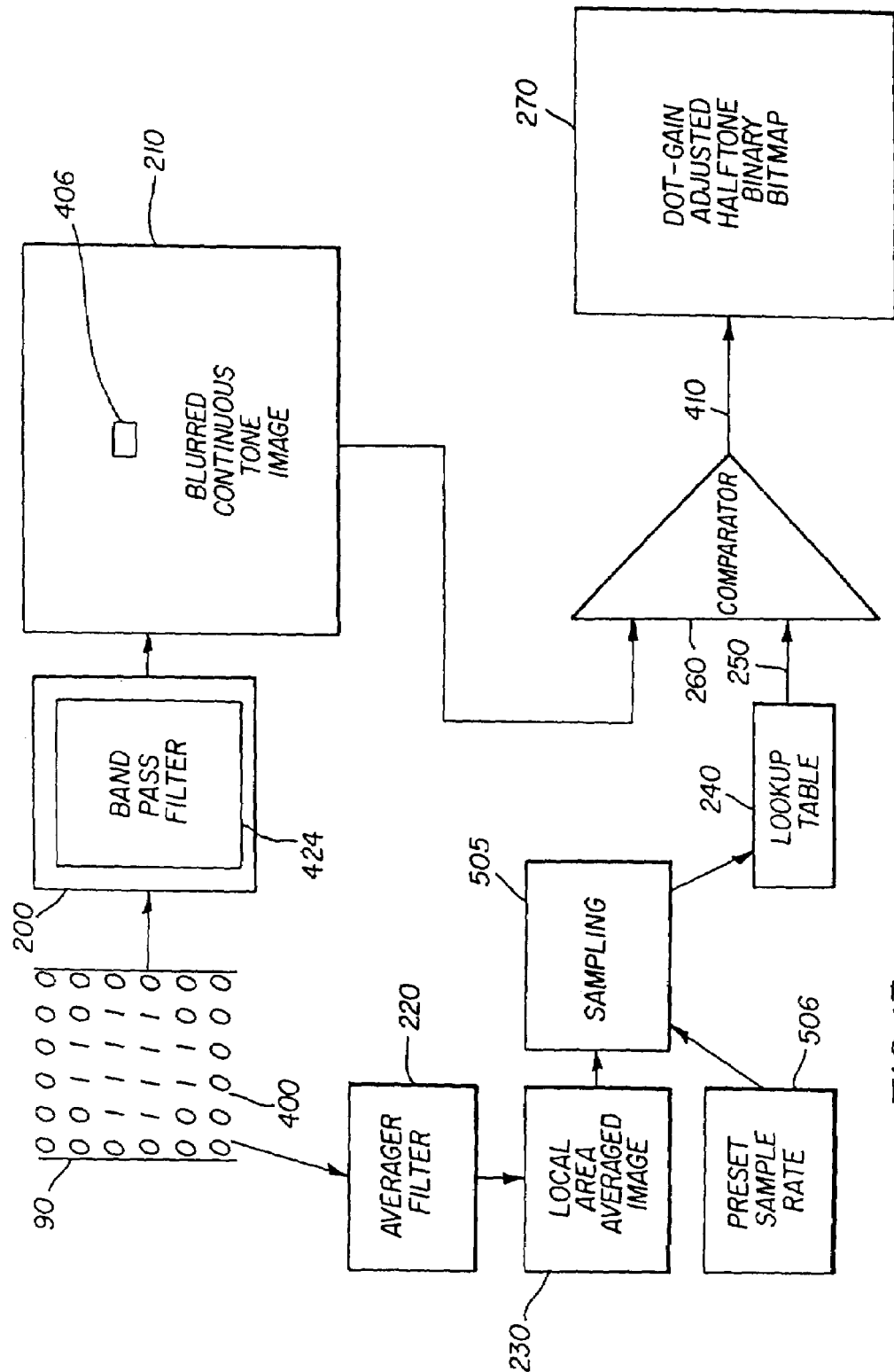
FIG. 13 is a block diagram showing the method of the present invention using a band pass filter.

The band pass filter 424 is shown is FIG. 13.

The first digital filter 200 can be a horizontal filter, a vertical filter or a combination of at least one vertical filter and at least one horizontal filter.

The second digital filter 220 can be a horizontal filter, a vertical filter or a combination of at least one vertical filter and at least one horizontal filter.

The second digital filter 220 can be an averager filter or a low pass filter. The halftone binary bitmap file 425 can be generated by a raster image processor or from a high resolution scan of a halftone film.

The halftone binary bitmap file 425 or 527 preferably have a resolution of between 600 dpi and 6000 dpi and more preferably between 1800 dpi and 3000 dpi.

The lookup table 240 is determined by the color separation that the halftone binary bitmap file 425 or 527 represents.

The invention contemplates that the step of processing the halftone binary bitmap file 425 or 527 a specific screen ruling 426 and a specific screen angle 428.

The lookup table 240 can be optionally determined by a halftone binary bitmap file screen ruling 426.

The lookup table 240 can optionally be determined by a halftone binary bitmap file screen angle 428.

The preset sample rate 506 can be is determined by a screen ruling of the halftone binary bitmap file 425 or 527.

The preset sample rate 506 alternatively can be is determined by a screen angle 428 of the halftone binary bitmap file 425 or 527.

The preset sample rate 506 can be determined by a screen angle 426 and a screen ruling 428 of the halftone binary bitmap file 425 or 527 in an alternative embodiment.

The invention has been described in detail with particular reference to certain preferred embodiments thereof, but it will be understood that variations and modifications can be effected within the scope of the invention.

PARTS LIST

10. Prepress workstation
20. Disk with customer artwork
30. Raster image processor (RIP) for proofing
31. Dot-gain curve
33. Test proof
40. Raster image processor (RIP) for printing
41. Dot-gain curve
42. Test proof
50. Proofing system disk
60. Proofing system
65. Digital halftone color proof
69. Target proof densities
70. Plate writing system
75. Printing plates
76. Benchmark proof densities 80. Printing press
85. Color halftone press-sheet
87. Target press sheet values
89. Benchmark press sheet values
90. Plate writing system disk
100. Digital film writer
102. Film
104. Optical contact exposure
110. Dot-gain correction box for proofing
111. Dot-gain correction box for printing
112. Combined dot-gain curve
114. Dot-gain curve
200. Spatial filter
210. Blurred continuous tone image
212. Pixel
220. Averager filter
230. Local area averaged image
232. Averaged pixel
240. Lookup table
250. Threshold values
260. Comparator
270. Dot-gain adjusted halftone binary bitmap
280. Off micro-pixel
290. On micro-pixel
300. Additional micro-pixel to add dot-gain
310. Deleted micro-pixel to subtract dot-gain
400. Binary pixels
406. Weighted sum
410. Binary Pixel output
414. Blur Filter
416. Edge enhancement filter
418. Averager Filter
420. High pass filter
422. Lower pass filter
424. Band pass filter
425. Binary bitmap files for printing
426. Screen ruling
428. Screen angle
505. Sampling
506. Preset sample rate
527. Binary bitmap files for proofing

What is claimed is:

1. A method for adjusting dot-gain for a halftone binary bitmap file comprising the steps of:
   (a) inputting a halftone binary bitmap file comprising binary pixels to a digital filter;
   (b) filtering the binary pixels with the digital filter generating a weighted sum of the binary pixels producing a first set of multilevel pixels;
   (c) filtering the binary pixels with a second digital filter producing a second set of multilevel pixels;
   (d) sampling the second set of multilevel pixels at a preset sample rate identifying a set of sampled multilevel pixels;
   (e) inputting the set of sampled multilevel pixels to a lookup table to create an output that is a threshold level for the set of sampled multilevel pixels;
   (f) using the first multilevel pixels and comparing to the threshold level for the set of sampled multilevel pixels and generating a binary pixel output;
   (g) collecting the binary output and forming an adjusted halftone binary bitmap; and
   (h) passing the adjusted halftone binary bitmap directly to a proofing system.

2. The method of claim 1, wherein the first digital filter is a blur filter, an edge enhancement filter, an averager filter, a high pass filter, a low pass filter, or a band pass filter.

3. The method of claim 1, wherein the first digital filter is a horizontal filter, a vertical filter or a combination of at least one vertical filter and at least one horizontal filter.

4. The method of claim 1, wherein the second digital filter is a horizontal filter, a vertical filter or a combination of at least one vertical filter and at least one horizontal filter.

5. The method of claim 1, wherein the second digital filter is an averager filter.

6. The method of claim 1, wherein the second digital filter is a low pass filter.

7. The method of claim 1, wherein the halftone binary bitmap file is generated by a raster image processor.

8. The method of claim 1, wherein the halftone binary bitmap file is generated from a high resolution scan of a halftone film.

9. The method of claim 1, wherein the halftone binary bitmap file has a resolution of between 600 dpi and 6000 dpi.

10. The method of claim 9, wherein the halftone binary bitmap file has a resolution of between 1800 dpi and 3000 dpi.

11. The method of claim 1, wherein the lookup table is determined by the color separation that the halftone binary bitmap file represents.

12. The method of claim 1, further comprising the step of processing the halftone binary bitmap file at a specific screen ruling and a specific screen angle.

13. The method of claim 1, wherein the lookup table is determined by a halftone binary bitmap file screen ruling.

14. The method of claim 1, wherein the lookup table is determined by a halftone binary bitmap file screen angle.

15. The method of claim 1, wherein the preset sample rate is determined by a screen ruling of the halftone binary bitmap file.

16. The method of claim 1, wherein the preset sample rate is determined by a screen angle of the halftone binary bitmap file.

17. The method of claim 1, wherein the preset sample rate is determined by a screen angle and a screen ruling of the halftone binary bitmap file.

18. The method of claim 1, wherein the preset sample rate is determined using a halftone bitmap screen ruling and a halftone bitmap screen angle.

19. A method for adjusting dot-gain for a halftone binary print comprising the steps of:
   (a) inputting a halftone binary bitmap file comprising binary pixels to a digital filter;
   (b) filtering the binary pixels with the digital filter generating a weighted sum of the binary pixels producing a first multilevel pixel;
   (c) filtering the binary pixels with a second digital filter producing a second multilevel pixel;
   (d) sampling a plurality of second multilevel pixels at a preset sample rate identifying sampled multilevel pixels;
   (e) inputting the sampled multilevel pixels to a lookup table to create an output that is a threshold level for the sampled multilevel pixels;
   (f) using a plurality of first multilevel pixels and comparing the plurality of first multilevel pixels to the threshold level for the sampled multilevel pixels and generating a binary pixel output;
   (g) collecting the binary pixel output and forming an adjusted halftone binary bitmap;
   (h) passing the adjusted halftone binary bitmap directly to a proofing system; and
   (i) printing the adjusted halftone binary bitmap.

20. The method of claim 19, wherein the first digital filter is a blur filter, an edge enhancement filter, an averager filter, a high pass filter, a low pass filter, or a band pass filter.

21. The method of claim 19, wherein the first digital filter is horizontal filter, a vertical filter or a combination of at least one vertical filter and at least one horizontal filter.

22. The method of claim 19, wherein the second digital filter is a horizontal filter, a vertical filter or a combination of at least one vertical filter and at least one horizontal filter.

23. The method of claim 19, wherein the second digital filter is an averager filter.

24. The method of claim 19, wherein the second digital filter is a low pass filter.

25. The method of claim 19, wherein the halftone binary bitmap file is generated by a raster image processor.

26. The method of claim 19, wherein the halftone binary bitmap file is generated from a high resolution scan of a halftone film.

27. The method of claim 19, wherein the halftone binary bitmap file has a resolution of between 600 dpi and 6000 dpi.

28. The method of claim 27, wherein the halftone binary bitmap file has a resolution of between 1800 dpi and 3000 dpi.

29. The method of claim 19, wherein the lookup table is determined by the color separation that the halftone binary bitmap file represents.

30. The method of claim 19, further comprising the step of processing the halftone binary bitmap file at a specific screen ruling and a specific screen angle.

31. The method of claim 19, wherein the lookup table is determined by a halftone binary bitmap file screen ruling.

32. The method of claim 19, wherein the lookup table is determined by a halftone binary bitmap file screen angle.

33. The method of claim 19, wherein the preset sample rate is determined by a screen ruling of the halftone binary bitmap file.

34. The method of claim 19, wherein the preset sample rate is determined by a screen angle of the halftone binary bitmap file.

35. The method of claim 19, wherein the preset sample rate is determined by a screen angle and a screen ruling of the halftone binary bitmap file.

36. The method of claim 19, wherein the preset sample rate is determined by a halftone bitmap file screen ruling and a halftone binary bitmap file screen angle.

37. A method for adjusting dot-gain for a printing plate comprising the steps of:
  (a) inputting a halftone binary bitmap file comprising binary pixels to a digital filter;
  (b) filtering the binary pixels with the digital filter generating a weighted sum of the binary pixels producing a multilevel pixel;
  (c) filtering the binary pixels with a second digital filter producing a second multilevel pixel;
  (d) sampling a plurality of second multilevel pixels at a preset sample rate identifying sampled multilevel pixels;
  (e) inputting the sampled multilevel pixels to a lookup table to create an output that is a threshold level for the sampled multilevel pixels;
  (f) using a plurality of first multilevel pixels and comparing the plurality of first multilevel pixels to the threshold level for the sampled multilevel pixels and generating a binary pixel output;
  (g) collecting the binary output and forming an adjusted halftone binary bitmap;
  (h) passing the adjusted halftone binary bitmap directly to a proofing system; and
  (i) exposing a printing plate to the adjusted halftone binary bitmap.

38. The method of claim 37, wherein the first digital filter is a blur filter, an edge enhancement filter, an averager filter, a high pass filter, a low pass filter, or a band pass filter.

39. The method of claim 37, wherein the first digital filter is a horizontal filter, a vertical filter or a combination of at least one vertical filter and at least one horizontal filter.

40. The method of claim 37, wherein the second digital filter is a horizontal filter, a vertical filter or a combination of at least one vertical filter and at least one horizontal filter.

41. The method of claim 37, wherein the second digital filter is an averager filter.

42. The method of claim 37, wherein the second digital filter is a low pass filter.

43. The method of claim 37, wherein the halftone binary bitmap file is generated by a raster image processor.

44. The method of claim 37, wherein the halftone binary bitmap file is generated from a high resolution scan of a halftone film.

45. The method of claim 37, wherein the halftone binary bitmap file has a resolution of between 600 dpi and 6000 dpi.

46. The method of claim 45, wherein the halftone binary bitmap file has a resolution of between 1800 dpi and 3000 dpi.

47. The method of claim 37, wherein the lookup table is determined by the color separation that the halftone binary bitmap file represents.

48. The method of claim 37, further comprising the step of processing the halftone binary bitmap file at a specific screen ruling and a specific screen angle.

49. The method of claim 37, wherein the lookup table is determined by a halftone binary bitmap file screen ruling.

50. The method of claim 37, wherein the lookup table is determined by a halftone binary bitmap file screen angle.

51. The method of claim 37, wherein the preset sample rate is determined by a screen ruling of the halftone binary bitmap file.

52. The method of claim 37, wherein the preset sample rate is determined by a screen angle of the halftone binary bitmap file.

53. The method of claim 37, wherein the preset sample rate is determined by a screen angle and a screen ruling of the halftone binary bitmap file.

54. The method of claim 37, wherein the preset sample rate is determined by a halftone bitmap file screen ruling and a halftone binary bitmap file screen angle.

* * * * *